R. M. LANGDON.
CHAIN.
APPLICATION FILED DEC. 19, 1919.
1,395,283.
Patented Nov. 1, 1921.
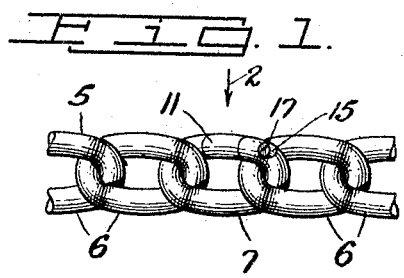
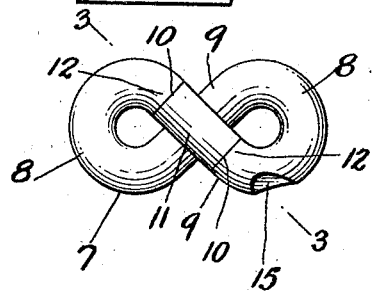
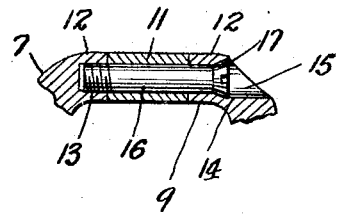
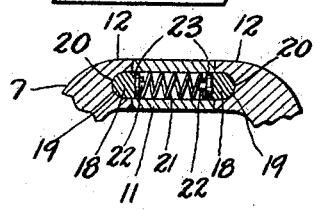
Inventor
Robert M. Langdon,
By his Attorneys

UNITED STATES PATENT OFFICE.

ROBERT M. LANGDON, OF ENGLEWOOD CLIFFS, NEW JERSEY.

CHAIN.

1,395,283.  Specification of Letters Patent.  Patented Nov. 1, 1921.

Application filed December 19, 1919. Serial No. 345,951.

*To all whom it may concern:*

Be it known that I, ROBERT M. LANGDON, a citizen of the United States, and residing at Englewood Cliffs, in the county of Bergen and State of New Jersey, have invented certain new and useful Improvements in Chains, of which the following is a specification, such as will enable those skilled in the art to which it appertains to make and use the same.

This invention relates to what are known as skid chains or anti-skid chains used in connection with the wheels of motor driven vehicles, and the object thereof is to provide improved means for repairing broken chains of this class whereby a broken chain or chains may be quickly and easily repaired without removing or detaching said chain or chains from the wheel or wheels of the vehicle; and with this and other objects in view the invention consists of an improved repair link for chains of the class specified which may be quickly and easily substituted for the broken link without removing such chain or chains from the wheel or wheels in connection with which they are used.

The invention is fully disclosed in the following specification, of which the accompanying drawing forms a part, in which the separate parts of my improvement are designated by suitable reference characters in each of the views, and in which:—

Figure 1 is a plan view of a small section of a chain showing one of my improved links connected therewith;

Fig. 2 a view looking in the direction of the arrow 2 of Fig. 1 of my improved repair link showing the same on an enlarged scale;

Fig. 3 a partial section on the line 3—3 of Fig. 2; and,

Fig. 4 a view similar to Fig. 3 but showing a modified form of construction.

In Fig. 1 of the drawing, I have shown at 5 a small section of a chain, preferably constructed in the manner of skid chains, and said chain is made up of a plurality of links 6 which are approximately elliptical in form in plan as shown in Fig. 1, and approximately 8-shaped in form when viewed from the side as illustrated in Fig. 2, and in Fig. 1 I have shown at 7 my improved repair link which is used for the purpose of joining two or more of the links 6 when a link or links become worn out or broken.

The repair link 7 is of the same general form as the links 6 and comprises end loop portions 8 joined by approximately straight shank portions 9. In practice, one of the shank or side portions 9 of the link is cut out as shown at 10 to form a detachable section 11 which, in the construction shown, is tubular in form as shown in Fig. 3.

In practice, the end portions 12 of the shank formed by cutting out the section 11 are provided with apertures 13 and 14, the aperture 13 being threaded while the aperture 14 opens out through the link, or a part of one of the loops 8 thereof as shown at 15.

In securing the section 11 in place as shown in Figs. 1 and 2, the same is placed in position or in line with the shank 9, after which a screw 16 is passed through the aperture 14, through the section 11 and into the threaded aperture 13, and when said screw is properly inserted in position it will be seen that the head 17 thereof will be countersunk in the aperture 14.

In the use of the device, it will be apparent that the repair link 7 will be placed upon the market and sold separately and independently of the chains, or with said chains, and when it is desired to repair or replace a broken link on a chain, the screw 16 is first removed in order to remove the detachable section 11 of the link, after which said link is connected with the links 6 of the chain in the manner illustrated in Fig. 1, and the section 11 placed in position and secured in such position by the screw 16. A chain repaired with one of my improved links will be just as strong and durable, if not stronger, at the places where the repair is made. As will be evident by reason of the simplicity of the device, a repair can be readily made within a short time and without any inconvenience to the operator.

In Fig. 4 I have shown a slight modification in which the detachable section 11 is held in place by spring-actuated lock devices 18, the outer faces of which are rounded as shown at 19 and operate in connection with correspondingly formed recesses 20 in the end portions 12 of the shank 9. A spiral spring 21 is mounted within the section 11 and the ends of said spring are secured to the inner faces of the blocks 18 as indicated at 22.

In the use of the device shown in Fig. 4, the separate parts of the repair links 7 are sold separately and detached, that is to say the link is sold with the section 11, blocks 18 and spring 21 detached from the link, and when it is desired to use the same the link 7 is connected with two links of the chain to be repaired in the manner illustrated in Fig. 1, after which the blocks 18 with the spring 21 secured thereto are mounted within the section 11 and the blocks pressed within said section by hand, or by a suitable tool, after which the section is moved into position between the separate end portions 12 of the link 7, and when placed in proper position the blocks 18 will be forced outwardly into the recesses 20 and the section 11 will be permanently locked in the link 7. It will be noted that the straight portions 23 on the blocks 18 which extend into the recesses 20 will prevent the detachment of the section 11.

While I have described my invention as particularly designed for use in connection with what are known as skid chains, it will be understood that the same may be used in connection with chains of any kind or class, or used for any purpose, and while I have shown certain details of construction in my improved repair link, I am not necessarily limited to these details, and various changes in and modifications of the construction herein shown and described may be made, within the scope of the appended claims, without departing from the spirit of my invention or sacrificing its advantages.

Having fully described my invention, what I claim as new and desire to secure by Letters Patent, is:—

1. A repair link of the class described comprising oppositely directed loop portions joined by shank portions, one of the shank portions being cut out to form an open link thereof, the ends of the shank which is cut out being provided with apertures, a tubular section adapted to be placed between the ends of said shank to close the cut out portion thereof, and means passed through said tubular section and into the apertures of said shank for securing said section in connection with the link.

2. A repair link of the class described comprising an open link member, a link section adapted to close the opening of said link member, and means movable longitudinally of said link section and projecting into and beyond the ends thereof for securing the same in position and to form a closed link of said link member, said means serving to reinforce said link section.

3. A repair link of the class described comprising an open link member, the ends of said link member being apertured, a link section adapted to close the opening in said link member, said section being provided with spring actuated parts adapted to project into the apertured portions of said link member to securely lock the link section in connection with said link member and to form a closed link of said link member.

4. A repair link of the class described comprising an open link member, a link section adapted to fit within the opening of said link member and to close the same, and means movable longitudinally of said link section and extending into said link member for securing and locking said link section in position and to form a closed link of said link member.

5. A repair link of the class described comprising an open link member, a link section adapted to fit within the opening of said link member and to close the same, and means spring actuated, movable longitudinally of said link section and extending into said link member and concealed therein, to irremovably lock said section in connection with said link member and to form a permanently closed link member thereof.

In testimony that I claim the foregoing as my invention I have signed my name in presence of the subscribing witnesses this 16th day of December, 1919.

ROBERT M. LANGDON.

Witnesses:
C. E. MULREANY,
H. E. THOMPSON.